United States Patent
Schulze-Reimann

(10) Patent No.: US 11,485,467 B2
(45) Date of Patent: Nov. 1, 2022

(54) ELECTRICAL ARRANGEMENT ON AN AIRCRAFT FUSELAGE WITH AN ELECTRICAL CONSUMER ON THE OUTSIDE OF THE FUSELAGE

(71) Applicant: Airbus Operations GmbH, Hamburg (DE)

(72) Inventor: Kai Schulze-Reimann, Hamburg (DE)

(73) Assignee: Airbus Operations GmbH

( * ) Notice: Subject to any disclaimer, the term of this patent is extended or adjusted under 35 U.S.C. 154(b) by 443 days.

(21) Appl. No.: 16/794,739

(22) Filed: Feb. 19, 2020

(65) Prior Publication Data
US 2020/0269964 A1   Aug. 27, 2020

(30) Foreign Application Priority Data
Feb. 27, 2019   (DE) .................... 10 2019 104 929.6

(51) Int. Cl.
*B64C 1/06* (2006.01)
*B32B 37/12* (2006.01)
(Continued)

(52) U.S. Cl.
CPC .......... *B64C 1/068* (2013.01); *B32B 37/1284* (2013.01); *B64C 1/0009* (2013.01);
(Continued)

(58) Field of Classification Search
CPC ......... B64C 1/068; B64C 1/0009; B64C 1/12; B64C 1/06; B64C 1/00; B32B 37/1284;
(Continued)

(56) References Cited

U.S. PATENT DOCUMENTS 4,912,334 A   3/1990 Anderson
6,491,551 B1   12/2002 Julian et al.
(Continued)

FOREIGN PATENT DOCUMENTS

DE   10034767 A1   5/2002
DE   102011100431 A1   11/2012
(Continued)

OTHER PUBLICATIONS

Extended European Search Report for Application No. 20159626 dated Jul. 27, 2020, 6 pages.
(Continued)

*Primary Examiner* — Robert L DeBeradinis
(74) *Attorney, Agent, or Firm* — Lerner, David, Littenberg, Krumholz & Mentlik, LLP

(57) ABSTRACT

An electrical arrangement on an aircraft fuselage has a fuselage component, an electrical consumer and a conductive electrical connection element. The connection element extends outwardly through an opening in the fuselage component and may have a bearing section on an inside or outside of the fuselage component that is arranged so as to tap or feed a voltage pole. The electrical connection element is electrically insulated from the opening and the fuselage component and is able to be connected to a voltage supply arranged on the inside. The electrical consumer is arranged on the outside of the fuselage component and is electrically connected to that part of the connection element projecting towards the outside of the fuselage.

14 Claims, 2 Drawing Sheets

(51) Int. Cl.
*B64C 1/00* (2006.01)
*H05B 33/02* (2006.01)
*B64C 1/12* (2006.01)
*H01R 13/73* (2006.01)
*H01R 13/74* (2006.01)
*H01R 13/717* (2006.01)
*H02G 3/00* (2006.01)

(52) U.S. Cl.
CPC ............ *B64C 1/12* (2013.01); *H01R 13/73* (2013.01); *H05B 33/02* (2013.01); *B64D 2221/00* (2013.01); *H01R 13/717* (2013.01); *H01R 13/74* (2013.01); *H02G 3/00* (2013.01)

(58) Field of Classification Search
CPC ...... B32B 37/12; H01R 13/73; H01R 13/717; H01R 13/74; H05B 33/02; B64D 2221/00; H02G 3/00
See application file for complete search history.

(56) References Cited

U.S. PATENT DOCUMENTS

| | | |
|---|---|---|
| 2002/0008976 A1 | 1/2002 | Gronemeier et al. |
| 2012/0318915 A1 | 12/2012 | Gatzke |
| 2015/0344121 A1 | 12/2015 | Frankenberger |
| 2018/0002033 A1 | 1/2018 | Loubiere et al. |

FOREIGN PATENT DOCUMENTS

| | | |
|---|---|---|
| DE | 102013013147 A1 | 2/2015 |
| DE | 102014008060 A1 | 12/2015 |
| WO | 2010025490 A1 | 3/2010 |
| WO | 2017174939 A1 | 10/2017 |

OTHER PUBLICATIONS

German Search Report for Application No. DE 10 2019 104 929.6 dated Jan. 22, 2020, 2 pages.

ELECTRICAL ARRANGEMENT ON AN AIRCRAFT FUSELAGE WITH AN ELECTRICAL CONSUMER ON THE OUTSIDE OF THE FUSELAGE

FIELD OF THE INVENTION

The invention relates to an electrical arrangement on an aircraft fuselage, and to an aircraft having a fuselage with at least one such arrangement.

BACKGROUND OF THE INVENTION

Modern commercial aircraft have numerous electrical consumers for many different functions. These may be located not only inside an aircraft fuselage but also on an outside of the fuselage. In order to couple these to a voltage supply arranged on the inside of the fuselage, an electrical connection that extends through a fuselage skin is required. One example of an electrical consumer arranged on the outside of the fuselage is an electroluminescent device by way of which it is possible to provide luminous elements.

Various variants are known in order to provide a power supply with a structure that is as flat as possible. For instance, US 2018/0002033 A1 discloses a strip-shaped flexible connection element that has a conductive layer with electrical insulation surrounding it. The connection element is guided through a slot into an inside of the fuselage and is fed there to a voltage supply.

BRIEF SUMMARY OF THE INVENTION

An aspect of the invention proposes an alternative electrical arrangement for a fuselage of an aircraft with an electrical consumer on an outside of the fuselage and a voltage supply on an inside of the fuselage, in which an electrical connection that is as robust as possible and still has a very flat structure is made possible.

What is proposed is an electrical arrangement on an aircraft fuselage, having a fuselage component, at least one electrical consumer, and a conductive electrical connection element, wherein the fuselage component has an inside and an outside, wherein an opening through which the electrical connection element extends is arranged in the fuselage component, wherein the electrical connection element has a plate-shaped bearing section and a feedthrough section extending transverse to the bearing section, wherein the bearing section is attached flush to the outside or the inside of the fuselage component and the feedthrough section runs from the bearing section through the opening and extends beyond the opening, wherein the electrical connection element is electrically insulated from the opening and the fuselage component and is able to be connected to a voltage supply arranged on the inside, and wherein the at least one electrical consumer is arranged on the outside of the fuselage component and is electrically connected to that part of the connection element projecting towards the outside of the fuselage.

The fuselage component may be an integral part of the aircraft fuselage. It could for instance be a fuselage shell, what is called a fuselage barrel, or another component that is to be assigned to the aircraft fuselage or connected thereto. In the context of the invention, the material from which the fuselage component is manufactured is largely irrelevant. In addition to metal materials, plastics, fibre-reinforced plastics or blends thereof may also be taken into consideration. In particular embodiments, as explained further below, it may be conducive for the fuselage component to be conductive.

The at least one electrical consumer could be an electroluminescent device, as mentioned at the outset. Aspects of the invention are in fact however also suitable for electrically coupling other electrical consumers, for example lighting apparatuses in general, communication devices, sensor systems and the like.

The conductive electrical connection element forms a key component. This deviates significantly in terms of its structure from strip-shaped connection elements or twisted cables. The plate-shaped bearing section may be provided so as to be arranged on the outside of the fuselage. It then in particular has a flat structure and therefore extends in a plane of main extent that matches the plane of main extent of the side in question of the fuselage component. The dimensions incorporated in this plane of extent considerably exceed the extent, that is to say the thickness, of the bearing section. This could preferably be less than 1 mm and particularly preferably be between 0.1 and 0.8 mm and for example between 0.2 and 0.5 mm.

As an alternative thereto, the bearing section may also be arranged on the inside of the fuselage component such that the feedthrough section extends outwardly through the opening towards the outside of the fuselage. The thickness of the bearing section in this case does not have to be as low as in the case of the arrangement on the outside of the fuselage.

The feedthrough section runs transverse and particularly preferably perpendicular thereto. Its dimensions could be configured depending on several boundary conditions. In addition to the expected current flow, these comprise a conductivity of the material that is used, an ability to be handled by assembly staff and also appropriate mechanical strength, in particular taking into consideration a pressure differential between the inside of the fuselage and the outside of the fuselage. The mechanical formation of an electrical connection may furthermore also be a dimensioning factor.

It is conceivable to use a plurality of such electrical connection elements independently of one another in the fuselage component.

The bearing section and the feedthrough section could form an integral component. As an alternative thereto, the electrical connection element may also be designed in multiple parts, such that the bearing section and the feedthrough section could be connected to one another by way of a suitable assembly method. An integral structure of these two sections in the form of a single component is however preferred.

The electrical insulation may be achieved through various measures. One variant comprises for example applying an insulating varnish or a resin to the surfaces in question of the connection element. As an alternative or in addition thereto, an insulating insert surrounding the connection element may be placed in the opening, said insert also extending underneath the surface area incorporated by the bearing section.

A pole of the electric voltage supply may be connected on the inside of the fuselage to the feedthrough section or the bearing section depending on which of the two sections are arranged on the inside of the fuselage. The corresponding pole may likewise be tapped at the section located on the outside of the fuselage. Deflecting a flexible strip-shaped connection element through a gap, twisting a conventional electrical line or other variants known in the prior art for feeding through a line are therefore not necessary. The section arranged on the inside of the fuselage may be connected very robustly in mechanical terms to an on-board cable or a busbar. The flat bearing section arranged on the outside or the outwardly protruding feedthrough section may be provided with an electrical connection based on a film in order to create the electrical connection to the consumer.

In one advantageous embodiment, the bearing section is an outer bearing section that is adhesively bonded to the outside of the fuselage. The feedthrough section may be plugged through the opening from the outside during assembly, such that the bearing section in question comes to a stop with the fuselage component and bears flat on the fuselage component. By virtue of flat adhesive bonding and in the case of a particularly flat design of the bearing section, it is possible to achieve a particularly low structural height of the outside of the fuselage that is not detrimental in terms of aerodynamic aspects. It is then advantageous for the electrical insulation to be provided by the plastic used for the adhesive bonding, such that no additional material layer is present.

One advantageous embodiment additionally has an inner bearing section that is arranged on the inside of the fuselage component, at least partly surrounds the feedthrough section or is arranged directly adjacent thereto, is insulated from the feedthrough section and is electrically conductively connected to the fuselage component. The inner bearing section could be connected to a second pole of a voltage supply or to ground. The at least one electrical consumer could then be supplied with a voltage through a connection to the connection component and the fuselage component. By virtue of arranging the inner bearing section adjacent to the feedthrough section or surrounding same, it is possible to achieve a particularly advantageous electrical connection element in which the terminals are present next to one another or coaxially in the form of a screw connector or the like.

A further advantageous embodiment has two or more outer bearing sections that each have an individual feedthrough section and are surrounded in an electrically insulating manner by a common inner bearing section that is arranged on the inside of the fuselage component, wherein the inner bearing section is electrically conductively connected to the fuselage component. A plurality of different electrical consumers could therefore be supplied by way of individual electrical connections. In the example of the electroluminescent device, a plurality of different arrays or regions could thereby be actuated. The fuselage component may then act as ground.

As an alternative, the bearing section may be an inner bearing section, wherein the feedthrough section extends through the opening towards the outside of the fuselage. The inner bearing section therefore bears flush on the inside of the fuselage and the electrical connection on the outside may be formed by an end of the feedthrough section located on the outside of the fuselage. A structural thickness is thereby likewise able to be controlled very precisely. One particular advantage is the fact that the inner bearing section does not necessarily have to be designed to be very thin, but may rather primarily be designed to meet handling and assembly requirements.

The feedthrough section preferably terminates in a manner substantially planar with the outside of the fuselage. The feedthrough section may furthermore also end slightly below the outside of the fuselage. The structure located on the outside of the fuselage may accordingly be formed so as to be very flat.

The inner bearing section may preferably be adhesively bonded to the inside of the fuselage. In this case too, the adhesive used for this purpose may at the same time serve as electrical insulator and simplify the structure.

The bearing section could likewise be connected in an electrically insulated manner to the inside of the fuselage by way of at least one connection means. The at least one connection means may consist of a non-conductive material. On the other hand, surfaces that are in contact with the connection means may also be electrically insulated. A connection that is both mechanically strong and reversible for maintenance purposes or for modification could be achieved by a screwing system.

If the bearing section is arranged on the inside of the fuselage, the inner bearing section may have a connection section on a side facing away from the feedthrough section and that protrudes from the bearing section in order to be connected to a voltage supply. Such a connection section is then connected in the same way as in the case of a feedthrough section fed through inwardly from the outside.

The electrical consumer is preferably connected to a section, arranged on the outside of the fuselage, of the electrical connection element by way of a conductive coating, wherein the conductive coating at least partially covers the section arranged on the outside of the fuselage. The electrical connection could be created underneath a sealed varnish layer by way of a thin and possibly large-surface conductive coating with a very low structural thickness and a low weight. The electrical connection is furthermore virtually invisible on the outside of the aircraft.

The fuselage component preferably comprises a conductive material. Conductivity is therefore able to be created in the form of a ground connection that extends through the entire fuselage component, at least at certain points. The conductive material could extend over the entire fuselage component, or discrete conductor tracks or conductive sections that allow the ground connection both on the inside of the fuselage and on the outside of the fuselage may be integrated.

As mentioned previously, the bearing section could be adhesively bonded to the fuselage component by way of an adhesive, wherein the adhesive is electrically insulating.

The invention furthermore relates to an aircraft having a fuselage with at least one such arrangement.

In one advantageous embodiment, the at least one electrical consumer may be an electroluminescent device.

BRIEF DESCRIPTION OF THE DRAWINGS

Further features, advantages and possible uses of the present invention will emerge from the following description of the exemplary embodiments and from the figures. Here, all of the features described and/or illustrated in the figures form the subject matter of the invention individually and in any desired combination, even independently of the combination of said features in the individual claims or the back-references thereof. Furthermore, in the figures, the same reference signs are used for identical or similar objects.

DETAILED DESCRIPTION

Figure 1:
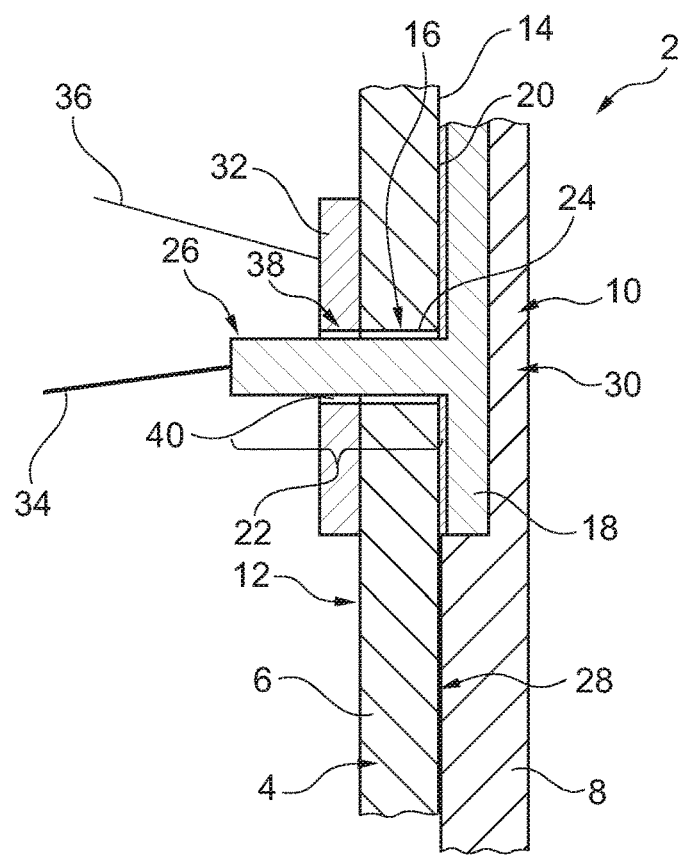
FIG. 1 shows a first exemplary embodiment of an electrical arrangement with an outer bearing section, in a sectional view.

FIG. 1 shows a first exemplary embodiment of an electrical arrangement 2 on an aircraft fuselage 4. The arrangement 2 has a fuselage component 6, an electrical consumer 8 in the form of an electroluminescent device and a conductive electrical connection element 10. The fuselage component 6 has an inside 12 and an outside 14. An opening 16 that extends completely through a material thickness of the fuselage component 6 is located in the fuselage component 4.

The electrical connection element 10 has a plate-shaped bearing section 18 that is arranged on the outside of the fuselage 14 in this example. It is therefore referred to further below as outer bearing section 18. It is adhesively bonded to the outside of the fuselage 14 by way of an adhesive layer 20. The adhesive layer 20 is designed for example to be electrically insulating. The outer bearing section 18 is designed to be very flat and could for example have a material thickness of less than 1 mm.

A feedthrough section 22, which runs from the outer bearing section 18 through the opening 16 beyond the inside 12, extends transverse thereto. A further adhesive layer 24, which is likewise preferably electrically insulating, is arranged in the region of the opening 16. The connection element 10 is designed to be electrically conductive such that, when a voltage pole is applied to an inner end 26 of the feedthrough section 22, the voltage pole also bears on the outer bearing section 18. By virtue of the electrical insulation provided by the adhesive layers 20 and 24, the outer bearing section 18 may have a different potential than for example the fuselage component 6 itself.

The electrical consumer 8 in the example that is shown has a very flat structure that is as far as possible not intended to influence the aerodynamic properties of the aircraft. By way of example, the consumer 8 may be electrically insulated from the fuselage component 6 by way of a varnish layer 28 on the outside of the fuselage 14. The consumer 8 may be electrically connected to the outer bearing section 18 by way of an electrically conductive coating 30.

An additional bearing plate 32, which bears flush on the inside of the fuselage 12 and is electrically connected to the fuselage component 6, is provided on the inside of the fuselage 12. The bearing plate 32 and the fuselage component 6 could for this purpose comprise a conductive material. The fuselage component 6 does not have to consist entirely of a conductive material, but rather may have only conductive sections. The inner bearing plate 32 may be connected to a ground pole such that the consumer 8 is thereby able to be connected via the fuselage component 6.

The inner bearing plate 32 has an opening 38 through which the feedthrough section 22 of the connection element 10 extends. An insulating layer 40 arranged in a circular manner around the feedthrough section 22 is provided here, such that it is possible to rule out an electrical connection between these two components.

By way of example, FIG. 1 shows a first connection cable 34 and a second connection cable 36 connected to the electrical connection element 10 or the bearing plate 32. A screwable electrical connector may of course also be used for the connection.

Figure 2:
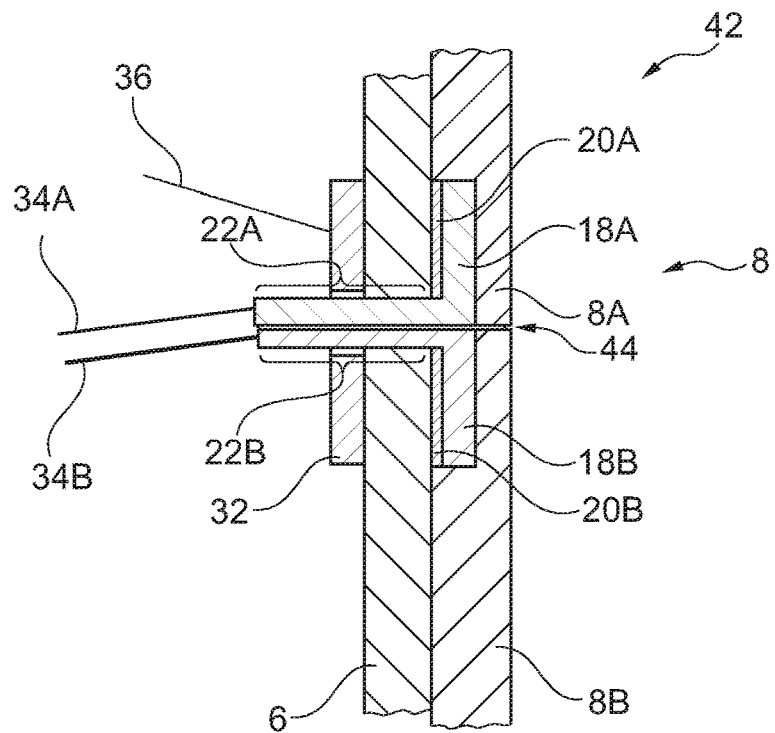
FIG. 2 shows a second exemplary embodiment of an electrical arrangement with a plurality of outer bearing sections, in a sectional view.

FIG. 2 shows a modified variant in the form of an arrangement 42. In this case, the electrical consumer 8 is divided in the form of two individual consumers 8A and 8B that are electrically insulated from one another at a separation point 44. Each of the consumers 8A and 8B is electrically connected to a respective outer bearing section 18A and 18B. They are both electrically insulated from the outside of the fuselage 14 by way of a respective adhesive layer 20A and 20B. Both outer bearing sections 18A and 18B are each connected to a feedthrough section 22A and 22B that extend through the openings 16 and 38. Both feedthrough sections 22A and 22B are therefore able to be connected to different voltage poles. The consumers 8A and 8B are able to be supplied with different voltages or actuated separately from one another, in spite of just a single electrical feedthrough.

The additional inner bearing plate 32, which is able to be connected to a ground pole, is also provided in this exemplary embodiment. A return line or ground connection may thereby be made possible for all of the consumers 8A and 8B.

Figure 3:
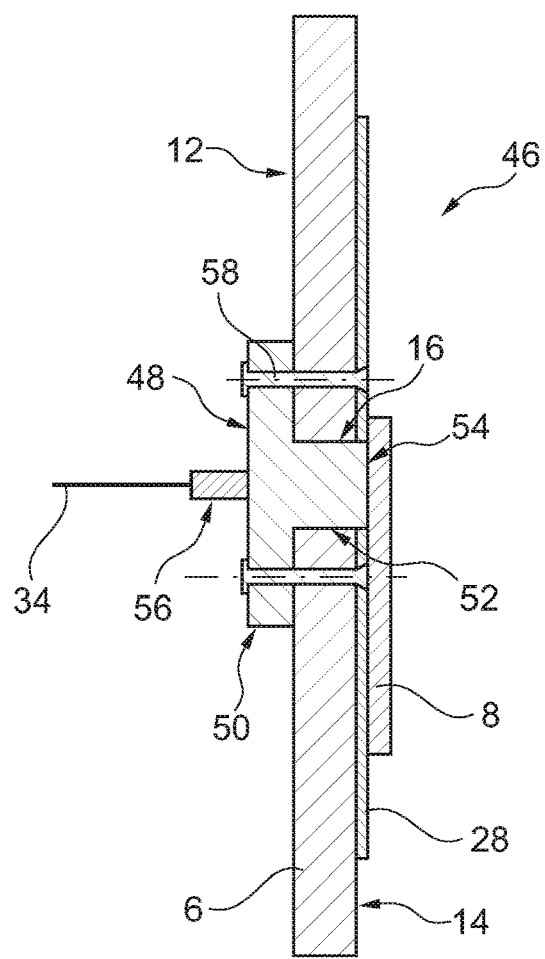
FIG. 3 shows a third exemplary embodiment of an electrical arrangement with an inner bearing section, in a sectional view.

FIG. 3 shows an alternative arrangement 46 in which an electrical connection element 48 that has an inner bearing section 50 is provided. Said bearing section sits on the inside of the fuselage 12 and has a feedthrough section 52 that extends outwardly through the opening 16. The feedthrough section 52 could be located at a very small distance above the outside of the fuselage 14 such that it protrudes slightly therefrom. This may create a protrusion that has a thickness of much less than 1 mm. Of course, a completely planar design with insulation at the edges could be present as a result of suitable measures. It is furthermore conceivable for the feedthrough section 52 to end slightly below the outer skin, such that an even flatter design is achieved.

A varnish layer 28, on which the electrical consumer 8 is placed, is arranged on the outside of the fuselage 14. Said electrical consumer may be connected directly to an outwardly facing surface 54 of the feedthrough section 52 via a conductive coating. An additional connection section 56 that protrudes from the inner bearing section 50 and is able to be connected to a voltage supply, that is to say a voltage pole, is arranged on the inner bearing section 50.

By way of example, the connection element 48 is screwed to the fuselage component 6 and for this purpose has connection means 58 in the form of screws or the like. It is understood that the connection is preferably electrically insulated.

Figure 4:
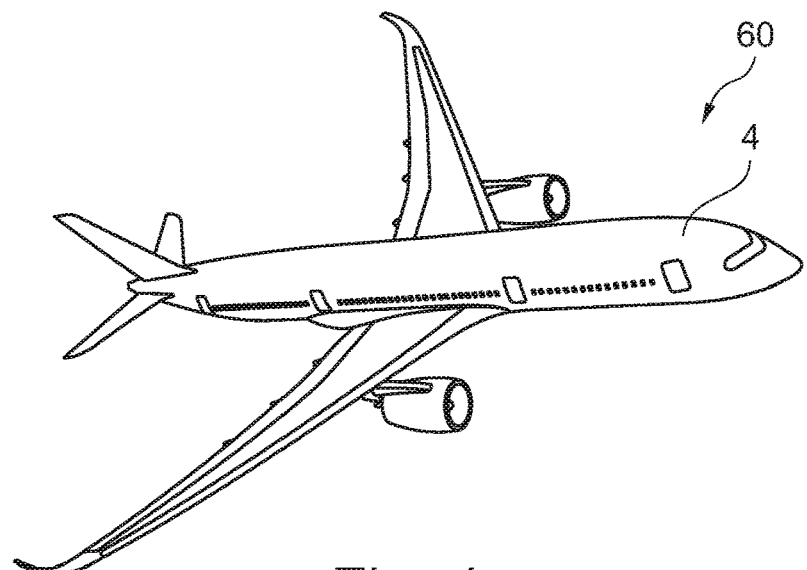
FIG. 4 shows an aircraft.

Finally, FIG. 4 shows an aircraft 60 with a fuselage 4 that has at least one arrangement 2, 42 or 46 illustrated above.

It is additionally pointed out that "having" or "comprising" does not rule out other elements or steps, and "a" or "an" does not rule out a multiplicity. It is also pointed out that features that have been described with reference to one of the above exemplary embodiments may also be used in combination with other features of other exemplary embodiments described above. Reference signs in the claims are not to be regarded as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS

2 Arrangement
4 Aircraft fuselage
6 Fuselage component
8, 8A, 8B Electrical consumer
10 Electrical connection element
12 Inside
14 Outside
16 Opening
18, 18A, 18B Bearing section
20, 20A, 20B Adhesive layer
22, 22A, 22B Feedthrough section
24 Adhesive layer
26 Inner end
28 Varnish layer
30 Electrically conductive coating
32 Bearing plate
34, 34A, 34B First connection cable
36 Second connection cable
38 Opening
40 Insulating layer
42 Arrangement
44 Separation point
46 Arrangement
48 Electrical connection element
50 Inner bearing section
52 Feedthrough section
54 Surface
56 Connection section
58 Connection means
60 Aircraft

The invention claimed is:

1. An electrical arrangement on an aircraft fuselage, comprising:
a fuselage component;
at least one electrical consumer; and
a conductive electrical connection element,
wherein the fuselage component has an inside and an outside,
wherein an opening through which the conductive electrical connection element extends is arranged in the fuselage component,
wherein the conductive electrical connection element has a plate-shaped bearing section and a feedthrough section extending transverse to the bearing section,
wherein the bearing section is attached flush to the outside or the inside of the fuselage component and the feedthrough section runs from the bearing section through the opening and extends beyond the opening,
wherein the conductive electrical connection element is electrically insulated from the opening and the fuselage component and is configured to be connected to a voltage supply arranged on the inside, and
wherein the at least one electrical consumer is arranged on the outside of the fuselage component and is electrically connected to that part of the conductive electrical connection element projecting towards the outside of the fuselage.

2. The arrangement according to claim 1, wherein the bearing is an outer bearing section adhesively bonded to the outside of the fuselage.

3. The arrangement according to claim 2, further comprising an inner bearing section that is arranged on the inside of the fuselage component, at least partly surrounds the feedthrough section or is arranged directly adjacent thereto, is insulated from the feedthrough section and is electrically conductively connected to the fuselage component.

4. The arrangement according to claim 2, wherein the bearing section comprises two or more outer bearing sections that each have an individual feedthrough section and are surrounded in an electrically insulating manner by a common inner bearing section that is arranged on the inside of the fuselage component, wherein the inner bearing section is electrically conductively connected to the fuselage component.

5. The arrangement according to claim 1,
wherein the bearing section is an inner bearing section, and
wherein the feedthrough section extends through the opening towards the outside of the fuselage.

6. The arrangement according to claim 5, wherein the inner bearing section is connected in an electrically insulated manner to the inside of the fuselage by way of at least one connection means.

7. The arrangement according to claim 5, wherein the inner bearing section is adhesively bonded to the inside of the fuselage.

8. The arrangement according to claim 7, wherein the feedthrough section terminates in a manner substantially planar with the outside of the fuselage.

9. The arrangement according to claim 7, wherein the inner bearing section has a connection section on a side facing away from the feedthrough section and protruding from the inner bearing section to be connected to a voltage supply.

10. The arrangement according to claim 1, wherein the electrical consumer is connected to a section, arranged on the outside of the fuselage, of the conductive electrical connection element by way of a conductive coating, wherein the conductive coating at least partially covers the section arranged on the outside of the fuselage.

11. The arrangement according to claim 1, wherein the fuselage component comprises a conductive material.

12. The arrangement according to claim 1, wherein the bearing section is adhesively bonded to the fuselage component by way of an adhesive, wherein the adhesive is electrically insulating.

13. An aircraft, comprising a fuselage with at least one arrangement according to claim 1.

14. The aircraft according to claim 13, wherein the at least one electrical consumer is an electroluminescent device.

* * * * *